Nov. 16, 1965 H. B. GIBSON 3,218,013
SELF-ANCHORING CONDUIT STRAP
Filed April 14, 1964 2 Sheets-Sheet 1
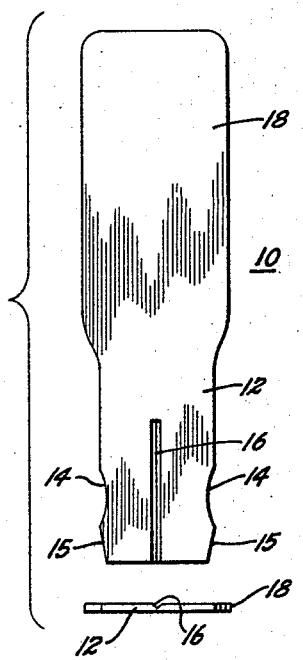
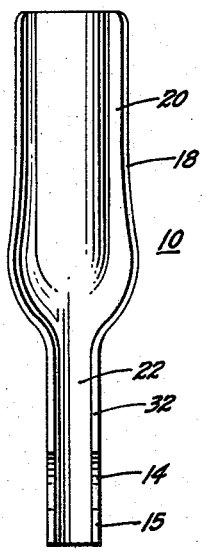
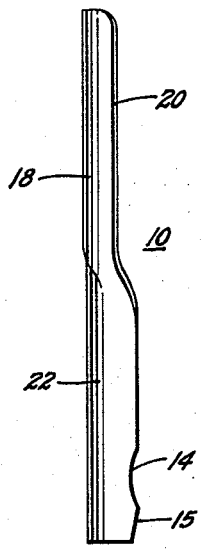
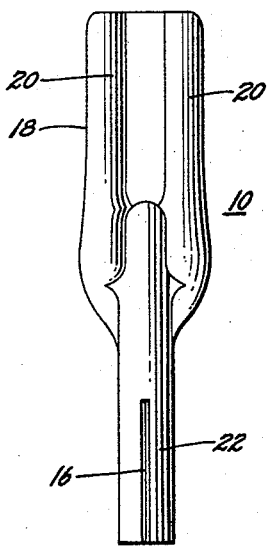
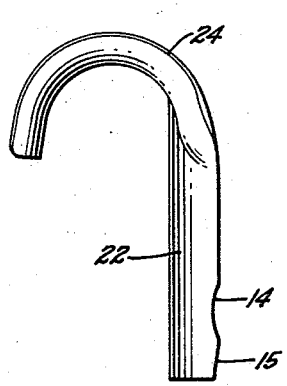
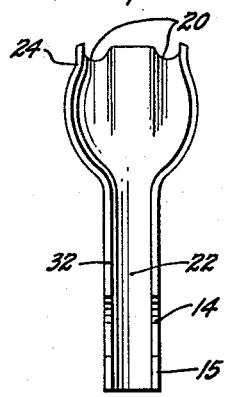
INVENTOR.
HOWARD B. GIBSON
BY *John Babis Jr.*
ATTORNEY.

Nov. 16, 1965 H. B. GIBSON 3,218,013
SELF-ANCHORING CONDUIT STRAP
Filed April 14, 1964 2 Sheets-Sheet 2
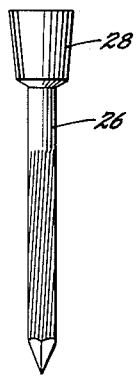
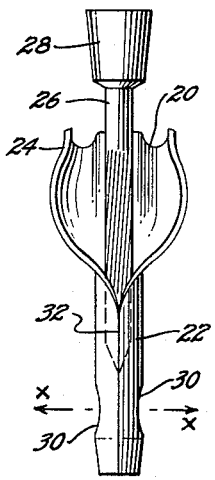
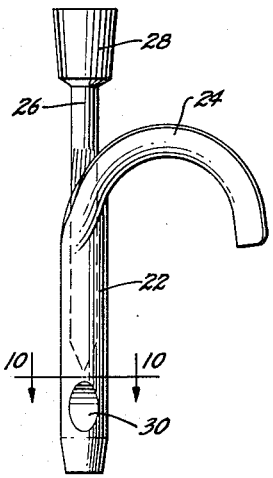
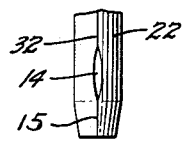
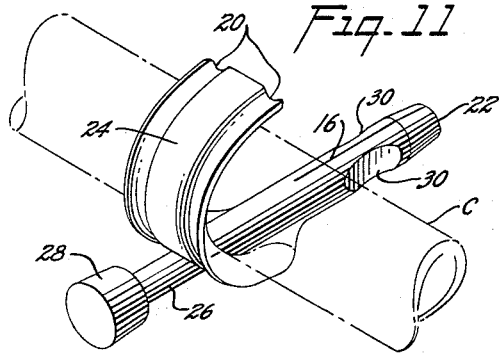
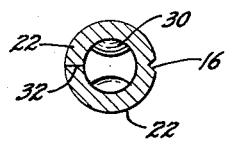
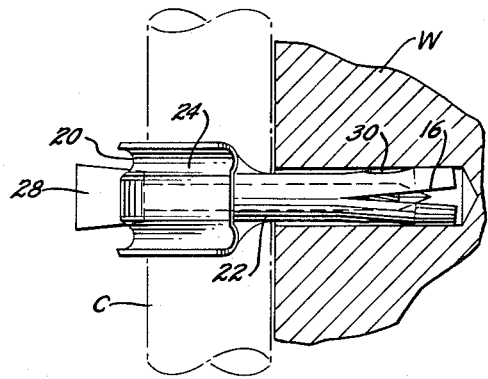
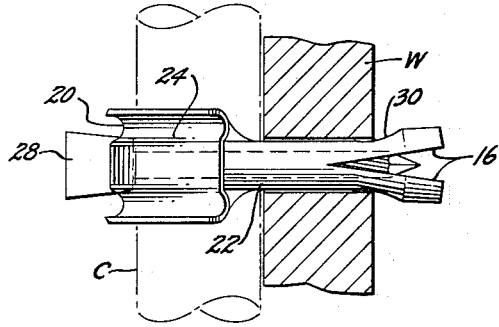
INVENTOR.
HOWARD B. GIBSON
BY
ATTORNEY.

United States Patent Office 3,218,013
Patented Nov. 16, 1965

3,218,013
SELF-ANCHORING CONDUIT STRAP
Howard B. Gibson, Glen Ridge, N.J., assignor to The Thomas & Betts Co., Incorporated, Elizabeth, N.J., a corporation of New Jersey
Filed Apr. 14, 1964, Ser. No. 359,606
8 Claims. (Cl. 248—73)

This invention relates to devices adapted to be expanded, at least in part, within suitable bores or holes formed in a wall of brick, cinder block, concrete, metal or wood, for example, for securing and/or supporting a pipe-like conduit adapted for receiving electrical conductors therethrough, and more particularly to improvements in a hook-like member having an expansible tubular shank with a captive expanding means therein as a unit, whereby said hook-like member is adapted to be anchored in such wall structures for the purpose aforesaid.

More specifically, the invention resides in a corrugated hook-like member, adapted to embrace a pipe-like conduit, which terminates in a tubular shank having a stenciled, scored, or indented linear mark parallel with and diametrically opposite its abutting seam forming margins, to reduce the wall thickness thereof and thereby weaken the same along said linear mark, said shank being further provided with coactable means whereby the free end portion of said shank is adapted to be split along said linear mark and divided at said seam, substantially into a pair of semi-circular end sections diverging more or less at an angle to the axial center of said shank, or expanded in the region of said coactable means, in response to the final inter-engagement thereof in the installation of said member.

In anchoring devices of this general character, as known heretofore, the expansion of a split tubular shank or equivalent in concrete or like structures, or metal, metal tubing and wood, produced a spotty or point anchoring engagement therewith which occurred solely in the region of and along the margins defining the split along said shank. Thus, when the anchored device was subjected to severe lateral stress or to a blow or shock transversely of its axial center, the anchorage was disturbed with the result that the device became loose more or less depending upon the load supported thereby.

Accordingly, it is an object of the invention to provide an improved self-anchoring conduit strap or expansible wall hook which is not subject to the above noted disadvantages.

A further object of the invention is to provide an improved self-anchoring conduit strap of the shank expansion type which includes a captive expanding means as a unit.

Another object of the invention is to provide a self anchoring conduit strap of the character described wherein an expansible tubular shank end portion is adapted to be brought into engagement with a peripheral surface defining a hole, throughout a major portion of its circumference.

A further object of the invention is to provide a self anchoring conduit strap of the wall hook type wherein the free end portion of an expansible tubular shank is adapted to be split or divided into a pair of diametrically opposite, semicircular end sections, which assume an angle to the axial center of the shank, upon the expansion of said shank.

Another object of the invention is to provide a self anchoring conduit strap of the shank expansion, wall hook type wherein a captive expanding means in said shank is adapted to exercise a wedging action on the hook end of the strap, upon the installation thereof, to compensate for misalignment of a conduit relative thereto.

A further object of the invention is to provide a self anchoring conduit strap of the shank expansion type having an expanding means held captive with an indented portion of said shank wherein said indented portion includes a stenciled mark therein providing a rupture or fracture area upon operation of said expanding means on the indented portion of said shank during the installation of said conduit strap.

Another object of the invention is to provide a self-anchoring conduit strap of the shank expansion type including a captive expanding means therein wherein the marginal edges defining a seam lengthwise of said shank, are each provided with integral means adapted to permit an indenting operation on said shank below said expanding means and at diametrically opposite points thereon without opening, deforming or otherwise disturbing the seam in said shank.

With the above and other objects in view, the invention resides in the novel construction, combination, and arrangement of parts, the novel features of which are set forth with particularity in the appended claims, the invention itself however, both as to its organization and method of operation, together with additional objects and advantages thereof, being best understood from the following description of a specific embodiment thereof, when taken in connection with the accompanying drawing in which:

FIGURE 1 is a plan view of a sheet metal blank having a predetermined size and configuration with an indented or stenciled linear score mark extending longitudinally centrally of one end portion thereof;

FIGURE 2 is a front elevation showing the blank of FIGURE 1, as first drawn to corrugate one end portion thereof and to impart a substantially semi-circular configuration to the opposite, stenciled end portion thereof;

FIGURE 3 is a side elevational view of the initially drawn blank of FIGURE 2;

FIGURE 4 is a rear elevation of the partially formed blank shown in FIGURE 2;

FIGURE 5 is a side elevational view of the improved conduit strap after a subsequent drawing operation in which the corrugated end portion thereof is formed into a substantially semi-circular hook-like end portion;

FIGURE 6 is a front elevation of the conduit strap shown in FIGURE 5;

FIGURE 7 is a view in elevation of a spirally fluted or grooved drive screw or pin as utilized in connection with the conduit strap of FIGURE 6;

FIGURE 8 is a similar view illustrating the closure of the semi-circular shank portion of the strap of FIGURE 6, wherein the spiral fluted or grooved drive screw or pin of FIGURE 7 is utilized as a mandrel whereby to close the open shank portion thereon in captive relation therewith;

FIGURE 8A is a detail view showing closure of the shank end portion;

FIGURE 9 is a side elevational view of the improved conduit strap after the shank closing operation has been completed and its free-end portion indented at diametrically opposite points thereon normal to its seam and its indented linear mark to constrict the opening therethrough at that point;

FIGURE 10 is a fragmentary cross sectional view taken on the line 10—10 of FIGURE 9; illustrating the constricted portion of the tubular shank of said conduit strap;

FIGURE 11 is a perspective view illustrating the improved self-anchoring strap embracing a conduit and in position, with respect to a wall structure for securing the same thereon upon driving a screw or pin, held captive therein into final position to expand the shank end thereof into tenacious engagement with said wall structure;

FIGURE 12 is a top plan view, partly in section, illustrating the shank-end portion of the anchoring strap substantially as expanded in a concrete wall structure after its screw or pin has been driven into final position; and FIGURE 13 is a view in side elevation partly in section, illustrating the improved anchoring strap in conduit supporting position as secured in a hollow tile or cinderblock wall structure.

Referring to the drawing, FIGURE 1 exemplifies a sheet metal blank 10 of predetermined size, thickness and configuration having a relatively narrow end portion 12, wherein its opposite marginal edges are each provided with an arcuate cut-out or indent 14, each terminating in an angular corner end 15, all in diametrically opposite relation for purposes hereinafter described. The end portion 12 of the blank 10 is further provided, centrally thereof, with a longitudinally extending linear score mark 16, extending a predetermined distance from the narrow end 12 of said blank, the linear score mark 16 being stenciled, indented, cut or otherwise formed to reduce the thickness of the blank along said score mark 16, whereby to weaken the same therealong to provide a rupture or fracture area in said blank 10, also for a purpose hereinafter described.

With a sheet metal blank 10, as provided, it is subsequently subjected to an initial drawing or stamping operation in which the opposite end portion 18 of the blank 10 is corrugated longitudinally adjacent each of its marginal edges as at 20, and its opposite end portion 12 rolled into a U-shape configuration in cross-section, as at 22, in FIGURES 2, 3 and 4.

Subsequently, the partially drawn blank 10, exemplified in FIGURES 2, 3 and 4, is subjected to another drawing operation wherein its corrugated end portion 18 is bent into substantially semi-circular or hook-like form, as indicated at 24 in FIGURE 5, whereby it is adapted for embracing a rigid or flexible conduit C.

Subsequently, a spirally knurled, fluted, grooved or threaded drive screw or pin 26 having a tapered head extension 28, as shown in FIGURE 7, is initially secured in the shank end portion 22 of the partially formed strap shown in FIGURE 6, in which operation the drive screw or pin 26 serves as a mandrel, at least in part, on which the open shank portion 22 is wrapped down or closed thereon as exemplified in FIGURES 8 and 9, whereby the pointed end portion of the pin 26 is frictionally secured therein and thus held captive as an integral part of the improved anchoring strap.

The improved hammer drive anchoring strap for conduits is thereafter indented at diametrically opposite points on its tubular shank portion 22, but beyond or below the enclosed end of the drive screw or pin 26, as indicated at 30, in FIGURES 9 and 10, to constrict the normal opening therethrough whereby to provide integral means internally thereof adapted to coact with the drive pin 26 upon its forced passage through the constricted portion of the opening through the tubular shank 22 of said anchoring strap.

In accordance with the invention and as shown in FIGURE 8A, the closure of the open shank portion 22, of FIGURE 6, into closed tubular form, tapers the free end thereof by reason of the angular corner portions 15, of the metal blank 10, as shown in FIGURE 1.

Further in accordance with the invention and as also shown in FIGURE 8A, the arcuate cut-outs 14 formed in the abutting marginal edges defining the seam 32 in the tubular shank 22 provide an opening or gap 14 in the shank seam 32, which opening or gap 14 is closed as shown in FIGURE 8, by the cold metal flow, shift or displacement thereof produced by the formation of the arcuate indentations 30, in the shank end portion 22, perpendicular to the axis of the shank 22, and at points on the circumference thereof which are located in transverse alignment with the longitudinal center of the opening or gap 14 (in cross-sectional alignment therewith) as indicated by the arrows X in FIGURE 8, the arcuate indentations 30 being formed in diametrically opposite relation, normal to the shank seam 32 and linear score mark 16, as shown in FIGURE 9, whereby the normal opening through the shank 22 is constricted, as illustrated in FIGURE 10, and the score mark 16 ruptured and outward flairing or bending of the split end portions of the shank 22, in response to the driving of the pin 26 therethrough, facilitated as shown in FIGURES 12 and 13.

With the hammer drive anchoring strap so completed, it is provided with a bright finish by the electro-deposition of a zinc coating or the like thereon, the zinc coating at the same time serving to cover the shank seam 32, its diametrically opposite linear stenciled mark 16 and the diametrically opposite indentations 30 normal thereto in the free end portion of the tubular shank 22 of the anchoring strap.

In the use of the improved anchoring strap for securing a conduit in place, a hole of suitable diameter is cut to the necessary depth in a brick, concrete or like type of wall and the shank end of the strap inserted therein with its hook-like end disposed on a conduit. With the strap so positioned, the drive screw or pin 26 is driven by means of a hammer or the like, to the full depth of the shank portion or until the bottom of its head 28 is substantially on or in close proximity to the upper end of the tubular shank 22. The elongated head 28 of the pin 26 is formed co-extensive therewith and tapers outwardly whereby it presents a slightly larger hammer striking area substantially level with or above the crown of the hook-like end 24 of the anchoring strap when driven to final position or substantially so, the tapered head 28 of the pin 26 by reason of its close proximity to the rear of the semi-circular bend defining the hook-like end 24 of the anchoring strap also serves to to reinforce or back-up the hook-like end 24, by bearing against the same at least in part. Moreover, the initial positioning of the hook-like end 24 of the anchoring strap on the conduit C, preparatory to driving the pin 26 to final position, serves as an anvil for the strap during the installation thereof.

As best shown in FIGURES 10 and 12, the driving of the pin 26 to final position brings the pointed end portion thereof into coactable engagement with the diametrically opposite, inwardly projecting indentations 30, forming a constriction in the opening through the tubular shank 22, whereby the free end of the shank is expanded in a substantially diverging manner by rupturing the linear stenciled or score mark 16 and opening the seam forming margins 32 at its free end portion to present two substantially angularly separated semi-circular half portions of the shank 22 into tenacious engagement with the defining periphery of the hole in the wall structure in which the anchoring strap is secured.

When the improved anchoring strap is to be secured to a hollow tile or cinder block type of wall structure W, a suitable hole is cut through the thickness thereof which is ordinarily less than the length of shank 22 of said strap whereby when the pin 26 is driven into final position, the end of the shank will be split open and separated in a diverging manner beyond the inner side of the hollow wall structure whereby the anchoring strap is securely held against a conduit C and against reverse movement as exemplified in FIGURE 13.

While a drive pin has been described as an integral or captive part of the self anchoring conduit strap forming the subject matter of this application, it is conceivable that the identical anchoring strap, without the drive pin shown and described, could be utilized for securing a conduit to a wall structure by substituting a nail or headed pin having a diameter at least equal to the inner diameter of the shank portion of the subject anchoring strap, and that the annular opening through the tubular shank portion 22 may be constricted in other manners, as for example, by an annular groove about the entire circumference of the shank portion 22, for the purpose shown and described.

From the foregoing, it will be clear that the invention provides an improved hammer drive anchoring strap for conduits, which is unique in that it precludes the assembly of separate parts in the use thereof, which obviates the loss of such separate parts and which provides a unitary structure which is highly efficient for the purposes intended.

While the invention has been illustrated and described with respect to one embodiment thereof, it is to be expressly understood that modifications may be made therein without departing from the inventive concept underlying the same. Therefore, the invention is not to be limited except as is necessitated by the prior art and the scope of the appended claims.

Having thus described my invention, what I claim as new and desire to secure by Letters Patent, is:

1. A unitary anchoring strap comprising a hook-like conduit embracing end portion and a tubular shank portion depending therefrom presenting parallel marginal edges in abutting relation defining a seam, a drive pin including an extended, tapered head-end coextensive therewith frictionally secured in one end portion of said tubular shank, linear means formed in the free end portion of said tubular shank parallel with and in diametrically opposite relation to said seam forming margins, providing a parting area of reduced thickness therealong, and integral means formed in the free end portion of said tubular shank in right angular relation to said seam and said linear means forming protrusions within said shank, adapted to be engaged by said drive pin whereby the free end portion of said tubular shank is expanded in response to forced movement of said drive pin into coactable engagement with said last named means.

2. A unitary sheet metal anchoring strap comprising a hook-like conduit embracing end portion and a tubular shank portion depending therefrom presenting parallel marginal edges in abutting relation defining a seam, a knurled drive pin having an elongated tapered head-end coextensive therewith frictionally secured in part in one end portion of said tubular shank, linear means formed in the free end portion of said tubular shank parallel with and in diametrically opposite relation to said seam forming margins providing a parting line of reduced thickness therealong, integral means formed in the circumference of the free end portion of said tubular shank in diametrically opposite relation forming protrusions within said shank adapted to be engaged by said drive pin whereby the free end portion of said shank is expanded in response to forced movement of said drive pin into coactable engagement with said last named means.

3. A unitary anchoring strap comprising a sheet metal stamping defining a hook-like conduit embracing end portion and a tubular shank portion depending therefrom presenting parallel marginal edges in abutting relation defining a seam, a spirally knurled drive pin having an elongated tapered head-end coextensive therewith frictionally secured in part in one end portion of said tubular shank, linear means formed in the free end portion of said tubular shank parallel with and in diametrically opposite relation to said seam forming margins providing a parting line of reduced thickness therealong, integral means formed in diametrically opposite relation in the circumference of said shank portion adjacent its free end normal to said seam constricting its opening therethrough and adapted to be engaged by said drive pin whereby the free end portion of said shank is separated along said seam and said linear means in diverging relation in response to forced movement of said drive pin into coactable engagement with said last named means.

4. A unitary anchoring strap comprising a sheet metal stamping defining a longitudinally corrugated hook-like conduit embracing end portion and a tubular shank portion depending therefrom presenting parallel marginal edges in abutting relation defining a seam, a spirally grooved drive pin having an elongated, tapered head-end coextensive therewith frictionally secured in part in one end portion of said tubular shank, a linear score mark indented longitudinally of the free end portion of said tubular shank in diametrically opposite relation to said seam forming margins providing a rupture area of reduced wall thickness therealong, integral means in diametrically opposite relation in the circumference of said shank portion adjacent its free end and normal to said seam forming protrusions within its opening therethrough adapted to be engaged by said drive pin whereby the free end portion of said shank is expanded in diverging relation in response to forced movement of said drive pin into coactable engagement with said last named means.

5. A unitary anchoring strap comprising a sheet metal stamping defining a hook-like conduit embracing end portion and a tubular shank portion depending therefrom presenting parallel marginal edges in abutting relation defining a seam having an oval opening therein extending lengthwise of said seam and radially of said tubular shank adjacent the free end thereof, a drive pin frictionally secured in part in the opposite end portion of said tubular shank, a linear score mark formed in the free end portion of said tubular shank parallel with and in diametrically opposite relation to said seam providing a parting area of reduced wall thickness therealong, and integral means formed in the free end portion of said tubular shank in diametrically opposite relation normal to said seam and linear score mark and located lengthwise of said tubular shank in central alignment with the longitudinal center of the oval opening in said seam forming a constriction within said tubular shank adapted to be engaged by said drive pin to expand the free end portion of said tubular shank into a pair of diverging end portions in response to forced movement of said drive pin through said constriction in said shank portion.

6. A unitary anchoring strap comprising a sheet metal stamping defining a hook-like conduit embracing end portion and a tubular shank portion depending therefrom presenting parallel marginal edges in abutting relation defining a seam having an elongated opening therein extending lengthwise of said seam and radially of said tubular shank adjacent the free end thereof, a drive pin including an extended, tapered head-end coextensive therewith frictionally secured in part in the opposite end portion of said tubular shank, a linear indented score mark formed in the free end portion of said tubular shank parallel with and in diametrically opposite relation to said seam providing a parting line of reduced wall thickness theralong, and integral means formed in the free end portion of said tubular shank in diametrically opposite relation normal to said seam and linear indent and disposed lengthwise of said tubular shank in central alignment with the longitudinal center of the elongated opening in said seam forming a constriction within said tubular shank and closing said elongated opening, said constricted shank portion being adapted to be engaged by said drive pin to expand the free end portion of said tubular shank into a pair of semi-circular end portions diverging substantially from said arcuate indentations in response to forced movement of said drive pin through said shank portion.

7. A unitary anchoring strap comprising a sheet metal stamping defining a corrugated hook-like, conduit embracing end portion and a tubular shank portion depending therefrom terminating in a slightly tapered free end portion, said tubular shank portion presenting parallel marginal edges in abutting relation defining a seam, said marginal edges being provided with complementary arcuate cut-outs in opposed relation forming an oval opening lengthwise of said seam and radially of said tubular shank adjacent the free end portion thereof, a drive pin frictionally secured at one end in the opposite end portion of said tubular shank, a linear, indented score mark formed in the free end portion of said tubular shank parallel with and in diametrically opposite relation to said seam providing a parting line of reduced wall thickness therealong, and a pair of arcuate indentations formed in the circumference of the free end portion of said tubular shank in diametrically opposite relation normal to said seam and said linear score mark and disposed lengthwise of said tubular shank with their point of greatest depth in transverse alignment with the longitudinal center of the oval opening in said seam forming a constriction within said tubular shank and closing said oval opening, said constricted shank portion being adapted to be engaged by said drive pin to expand the free end portion of said tubular shank into a pair of semi-circular end portions diverging substantially from said arcuate indentations in response to forced movement of said drive pin through said shank portion.

8. A unitary anchoring strap comprising a sheet metal stamping defining a hook-like conduit engaging end portion and a tubular shank portion depending therefrom and presenting parallel marginal edges in abutting relation defining a seam and terminating in a tapered free end, said marginal edges having arcuate cuts-outs in their edge faces in opposed relation forming an oval opening lengthwise of said seam radially of said shank portion, an indented linear score mark formed in the periphery of said shank portion in parallelism with and in diametrically opposite relation to said seam forming a rupture area of reduced wall thickness, and arcuate indents formed in the circumference of said shank portion in diametrically opposite relation at right angles to said seam and lengthwise thereof, the longitudinal center of said arcuate indents being in transverse alignment with the longitudinal center of said oval opening, said arcuate indents causing cold metal flow toward and closing said oval opening and forming opposed substantially arcuate projections within said tubular shank portion whereby the free end portion thereof is adapted to be split along said seam and linear score mark into a pair of diverging, semi-circular end portions.

References Cited by the Examiner
UNITED STATES PATENTS

| | | | |
|---|---|---|---|
| 1,476,835 | 12/1923 | Oleister | 248—74 X |
| 1,637,419 | 8/1927 | Klein | 85—85 |
| 1,789,660 | 1/1931 | Rosenberg | 85—84 |
| 1,821,401 | 9/1931 | Pierce | 85—85 |
| 2,219,788 | 10/1940 | Pleister | 85—85 |
| 2,525,736 | 10/1950 | Taylor | 248—74 X |
| 2,601,803 | 7/1952 | Newman | 85—84 |
| 2,913,204 | 11/1959 | Stewart | 248—71 |

FOREIGN PATENTS

| | | |
|---|---|---|
| 459,994 | 5/1928 | Germany. |
| 23,144 | 10/1910 | Great Britain. |
| 175,143 | 2/1922 | Great Britain. |

CLAUDE A. LE ROY, *Primary Examiner.*